United States Patent
Auger et al.

(10) Patent No.: US 9,832,367 B2
(45) Date of Patent: Nov. 28, 2017

(54) VIEWING DEVICE

(71) Applicant: Optelec Holding B.V., Barendrecht (NL)

(72) Inventors: Robert Auger, Verdun (CA); Johannes Jacobus Antonius Maria Vugts, Naaldwijk (NL); Ivar Illing, Rotterdam (NL)

(73) Assignee: Optelec Holding B.V., Barendrecht (NL)

( * ) Notice: Subject to any disclaimer, the term of this patent is extended or adjusted under 35 U.S.C. 154(b) by 278 days.

(21) Appl. No.: 14/144,748

(22) Filed: Dec. 31, 2013

(65) Prior Publication Data

US 2015/0189160 A1  Jul. 2, 2015

(51) Int. Cl.
| | | |
|---|---|---|
| G09B 21/00 | (2006.01) | |
| H04N 5/232 | (2006.01) | |
| G06F 1/16 | (2006.01) | |
| H04N 5/225 | (2006.01) | |

(52) U.S. Cl.
CPC ....... H04N 5/23216 (2013.01); G06F 1/1632 (2013.01); G09B 21/008 (2013.01); H04N 5/2251 (2013.01)

(58) Field of Classification Search
CPC .... G06F 1/1632; G09B 21/00; H04N 5/2251; H04N 5/23216
USPC ........... 348/142, 62; 382/114; 248/558, 121; 248/121.1
See application file for complete search history.

(56) References Cited

U.S. PATENT DOCUMENTS

| | | | |
|---|---|---|---|
| 6,259,006 B1 | 7/2001 | Parienti | |
| 6,353,529 B1* | 3/2002 | Cies | G06F 1/1616 248/917 |
| 7,490,887 B2* | 2/2009 | Vitito | B60K 35/00 248/917 |
| 7,492,579 B2* | 2/2009 | Homer | G06F 1/16 312/223.1 |
| 7,983,035 B1* | 7/2011 | Ting | F16M 11/041 361/679.41 |
| 8,115,831 B2* | 2/2012 | Rodriquez | H04N 1/195 348/240.3 |
| 8,201,687 B2* | 6/2012 | Zeliff | G06F 1/1626 206/320 |

(Continued)

FOREIGN PATENT DOCUMENTS

| | | | | |
|---|---|---|---|---|
| BR | WO 2010060168 A2 * | 6/2010 | ........... | G02B 27/022 |
| CH | WO 2007/121605 A1 | 11/2007 | | |

(Continued)

OTHER PUBLICATIONS

EPO Search Report and Written Opinion for EP Application No. 14200351 (Published as EP2908208), dated Oct. 12, 2015.*

(Continued)

*Primary Examiner* — Christopher S Kelley
*Assistant Examiner* — Kathleen Walsh
(74) *Attorney, Agent, or Firm* — NLO N.V.; Catherine A. Shultz

(57) ABSTRACT

An apparatus to capture and display an image of an object includes a frame, at least one optical sensor for capturing the image of the object, means for moving the frame relative to a surface of the object in a first direction, and means for moving the optical sensor relative to the frame in a second direction.

24 Claims, 8 Drawing Sheets

(56) References Cited

U.S. PATENT DOCUMENTS

| | | | | |
|---|---|---|---|---|
| 8,619,416 | B2* | 12/2013 | Lim | G06F 1/1632 361/679.41 |
| 8,690,576 | B2 | 4/2014 | Murphy et al. | |
| 8,743,278 | B2* | 6/2014 | Yoon | G02B 25/002 348/373 |
| 2003/0222848 | A1* | 12/2003 | Solomon | G06F 1/1601 345/156 |
| 2006/0232578 | A1* | 10/2006 | Reinhorn | G06F 1/1624 345/211 |
| 2006/0234784 | A1* | 10/2006 | Reinhorn | H04M 1/0268 455/575.1 |
| 2007/0035917 | A1* | 2/2007 | Hotelling | G06F 1/1632 361/679.56 |
| 2009/0059038 | A1* | 3/2009 | Seakins | G09B 21/001 348/240.99 |
| 2009/0091649 | A1* | 4/2009 | Anderson | B60R 1/00 348/333.01 |
| 2010/0053876 | A1* | 3/2010 | Widmer | G06F 1/1616 361/679.27 |
| 2010/0073515 | A1* | 3/2010 | Conard | G09B 21/008 348/229.1 |
| 2010/0079356 | A1* | 4/2010 | Hoellwarth | G02B 27/017 345/8 |
| 2010/0195279 | A1* | 8/2010 | Michael | G06F 1/1632 361/679.41 |
| 2011/0259788 | A1* | 10/2011 | Zeliff | G06F 1/1626 206/701 |
| 2012/0037285 | A1* | 2/2012 | Diebel | A45C 11/00 150/165 |
| 2012/0083314 | A1* | 4/2012 | Ng | H04M 1/11 455/557 |
| 2012/0106047 | A1* | 5/2012 | Chu | G06F 1/166 361/679.01 |
| 2012/0173018 | A1* | 7/2012 | Allen | B25J 13/06 700/245 |
| 2012/0194738 | A1* | 8/2012 | Wang | G06F 1/1632 348/552 |
| 2012/0268891 | A1* | 10/2012 | Cencioni | G06F 1/1626 361/679.55 |
| 2012/0293683 | A1* | 11/2012 | Osaka | G06F 1/1686 348/222.1 |
| 2012/0307026 | A1* | 12/2012 | Rodriguez | H04N 1/00129 348/63 |
| 2013/0068916 | A1* | 3/2013 | Mensing | F16M 11/048 248/558 |
| 2013/0076993 | A1* | 3/2013 | Wyllie | G09F 19/02 348/836 |
| 2013/0088830 | A1* | 4/2013 | Lim | G06F 1/1632 361/679.43 |
| 2013/0107136 | A1* | 5/2013 | Tamura | G06F 1/1632 348/836 |
| 2013/0107138 | A1* | 5/2013 | Matsumoto | H04N 5/64 348/836 |
| 2013/0109371 | A1* | 5/2013 | Brogan | G06F 1/1626 455/420 |
| 2013/0163197 | A1* | 6/2013 | Mack | F16M 11/00 361/679.56 |
| 2013/0208161 | A1* | 8/2013 | Yoon | G02B 25/002 348/308 |
| 2013/0248676 | A1* | 9/2013 | Wang | F16M 11/2021 248/462 |
| 2013/0249821 | A1 | 9/2013 | Dharmaraja et al. | |
| 2013/0256497 | A1* | 10/2013 | Radmard | F16M 11/00 248/558 |
| 2013/0275643 | A1* | 10/2013 | Teltz | G06F 1/1632 710/303 |
| 2014/0015448 | A1* | 1/2014 | Wikander | G06K 9/20 318/3 |
| 2014/0078389 | A1* | 3/2014 | Merz | H04N 5/2252 348/375 |
| 2014/0146446 | A1* | 5/2014 | Matsuda | H04M 1/72522 361/679.01 |
| 2014/0176767 | A1* | 6/2014 | Hamel | H04N 5/23296 348/240.2 |
| 2014/0181347 | A1* | 6/2014 | Hamel | G06F 13/4081 710/304 |
| 2014/0247548 | A1* | 9/2014 | Sharma | G06F 1/1626 361/679.27 |
| 2014/0263939 | A1* | 9/2014 | Rinner | F16M 11/10 248/688 |
| 2014/0347812 | A1* | 11/2014 | Lee | G06F 1/1679 361/679.55 |

FOREIGN PATENT DOCUMENTS

| | | | | |
|---|---|---|---|---|
| DE | 102010042612 A1 | * | 4/2012 | H04M 1/04 |
| EP | 2018030 | | 1/2009 | |
| IE | GB 2403370 A | * | 12/2004 | H04N 1/00347 |
| JP | 11355633 A | * | 12/1999 | |
| JP | 2003235037 A | * | 8/2003 | |
| JP | 2003235038 A | * | 8/2003 | |
| WO | 2009128700 | | 10/2009 | |
| WO | 2013135299 | | 9/2013 | |

OTHER PUBLICATIONS

Extended European Search Report for related European Application No. 15171383.1 dated Nov. 2, 2015 (8 pages).

Jagtman, S. "A new touch in Braille display design: The design of a next generation Braille display", TU Delft Institutional Repository, Aug. 28, 2013. Retrieved from the Internet on Oct. 20, 2015, URL:<http://repository.tudelft.nl/view/ir/uuid%3Abf0a67e1-c74a-4291-917f-c686f7501a9b> (3 pages).

* cited by examiner

VIEWING DEVICE

BACKGROUND

This invention relates to an apparatus to assist persons with impaired eyesight, low vision or other reading difficulties in reading or viewing an object.

In assisting those with low vision or impaired eyesight to view an object or read text, it can be useful to employ magnification and/or image enhancement. This can be done through different types of devices ranging from a simple hand-held magnifying glass to a machine which employs a camera for capturing the object and a screen for displaying an electronic representation of the object. The electronic representation can show the image magnified, with better contrast, different colors, inverted text and/or different brightness.

Generally, in the type of machine which displays an electronic representation of the object, the object is placed on a support, in front of the camera. The object is then manually moved with respect to the support and the camera so that the camera captures different parts of the object, and the screen subsequently displays the part being captured. The magnification level can typically be changed, resulting in less of the object being displayed on the screen when a large amount of magnification is desired. When a large amount of magnification is required, the object has to be moved around a lot in relation to the support and the camera in order to view the whole object.

SUMMARY

An apparatus to capture and display an image of an object includes a frame, at least one optical sensor for capturing the image of the object, means for moving the frame relative to a surface of the object in a first direction, and means for moving the optical sensor relative to the frame in a second direction.

Additional and/or alternative embodiments may include a screen for displaying the image of the object; the optical sensor and the screen moving in tandem; the optical sensor being attached to a back surface of the screen or to a plate positioned behind the screen; the second direction being parallel to the screen; the screen being removable from the apparatus; the screen being integral with a tablet computer; the second direction being substantially perpendicular to the first direction; a lighting arrangement for lighting the object; a second optical sensor, which optionally can be rotated; a photovoltaic panel for powering the apparatus; the screen being a touch screen; controls connected to the frame and/or the screen for controlling the screen, movement of the apparatus and/or the optical sensor; and/or the apparatus having a weight in the range of about 700 grams to 10 kilograms.

The means for moving the frame relative to a surface of the object can comprise any of one or more rollers, one or more skids, one or more slides, one or more treads or any combination of these or other devices which allow for movement relative to a surface of the object. Optionally any skids and/or slides can have upwardly curved ends and/or a low friction surface. The means could optionally be motorized.

The means for moving the optical sensor relative to the frame in a second direction could include one or more slides, wheels, rails, bearings, linkages and any combination of these or other devices which allow for movement of the optical sensor relative to the frame. The means could optionally be motorized.

According to an embodiment, the means for moving the frame across a surface of the object in a first direction defines a plane, and the screen has a first position generally parallel to the plane, and a second position at an angle to the plane. Optionally, the angle can be 40 degrees to 60 degrees.

According to an embodiment, the optical sensor can be rotated or moveable relative to the frame. This can facilitate being able to capture an image of the object or being able to capture an image of an object at a distance or at another location, for example, in front of or to the side of the apparatus.

According to an embodiment a device for displaying an image of an object comprises a frame which can move across a surface of the object in a first direction; a body connected to the frame and able to move in relation to the frame in a second direction; and at least one optical sensor connected to the body.

Additional and/or alternative embodiments may include a screen connected to the body for displaying images from the optical sensor; and/or the first direction being substantially perpendicular to the second direction.

According to an embodiment, a method of forming a device for displaying an image of an object comprises forming a frame which can move across a surface of the object; and connecting a body with at least one optical sensor to the frame so that it can move in relation to the frame in a second direction.

DETAILED DESCRIPTION

Figure 1A:
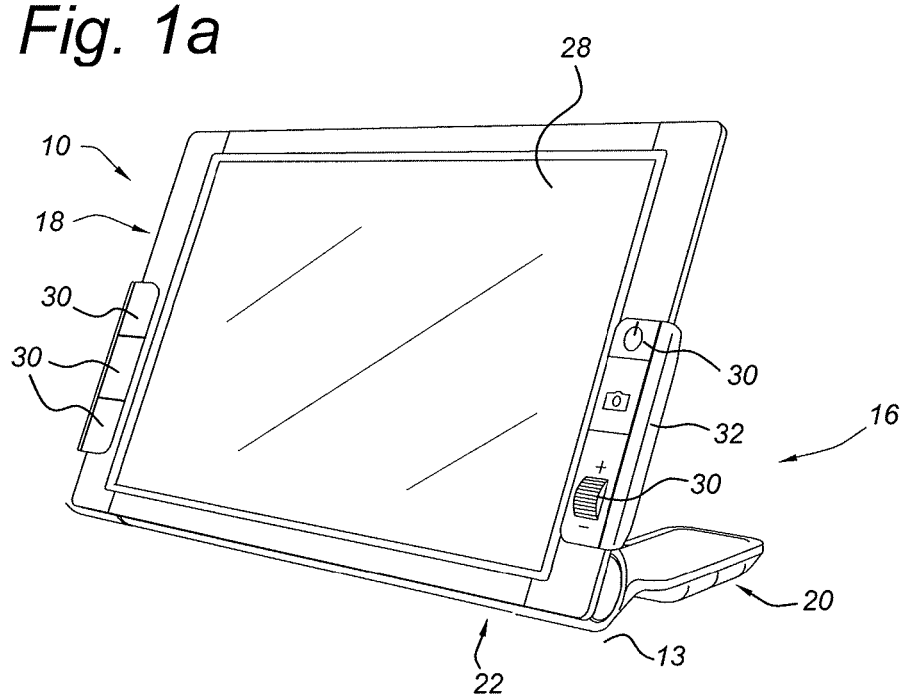
FIG. 1A shows a perspective front view of an apparatus for viewing an object.
Figure 1B:
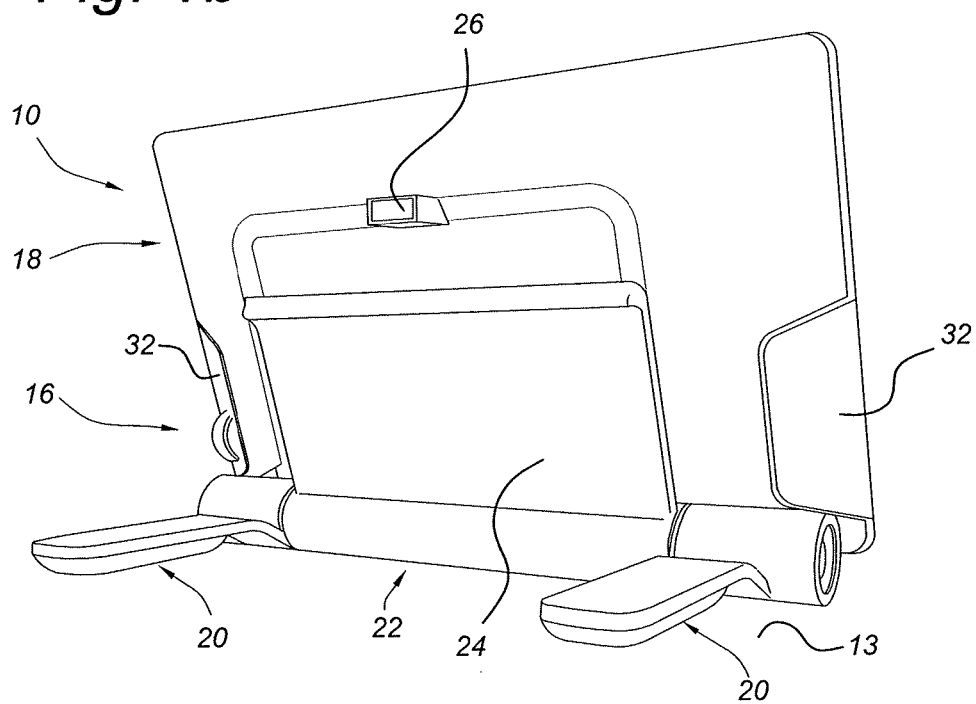
FIG. 1B shows a perspective view of the apparatus of FIG. 1A from a back side.
Figure 1C:
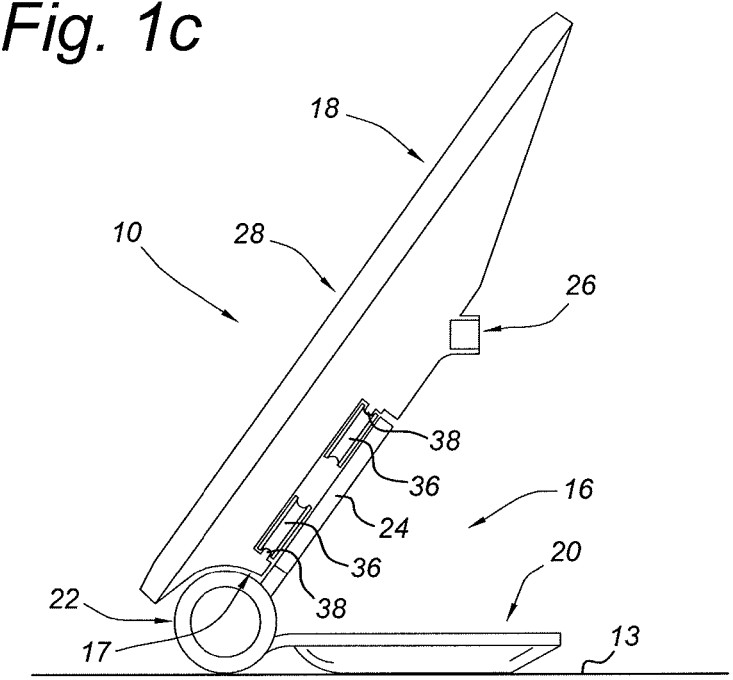
FIG. 1C shows a side view of the apparatus of FIG. 1A.
Figure 1D:
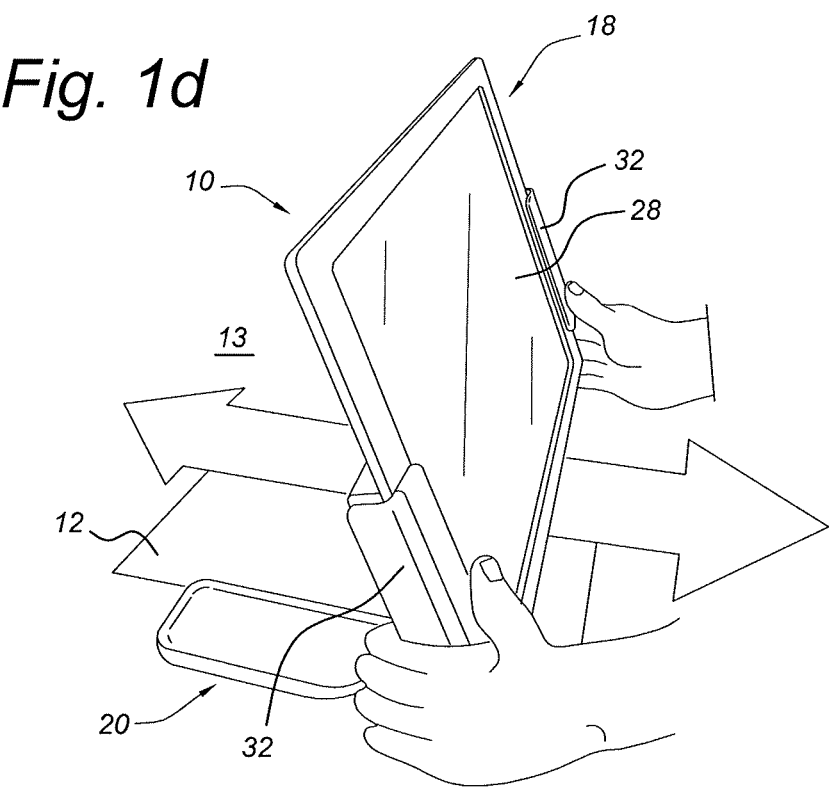
FIG. 1D shows a perspective view of the apparatus of FIG. 1A moving in a first direction.
Figure 1E:
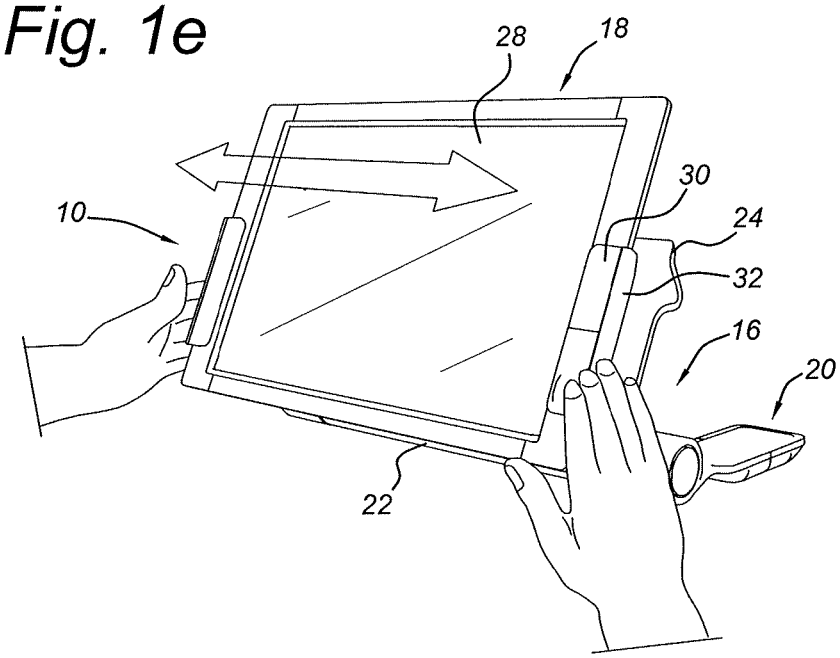
FIG. 1E shows a perspective view of the apparatus of FIG. 1A moving in a second direction.
Figure 1F:
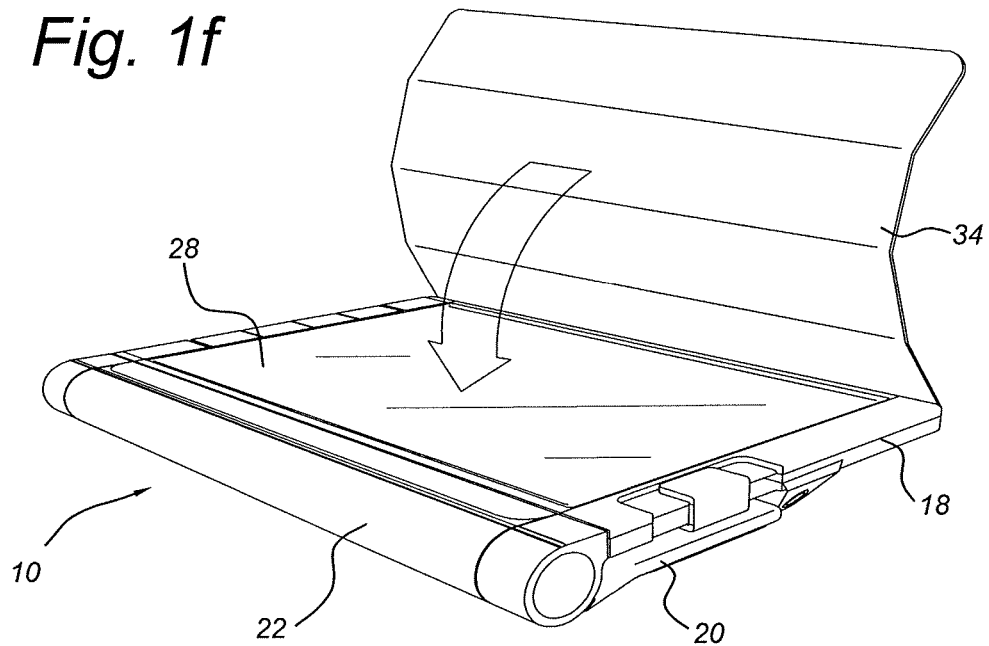
FIG. 1F shows a view of the apparatus of FIG. 1A in a closed position.

FIG. 1A shows a perspective view of apparatus 10 for viewing object 12 on surface 13, FIG. 1B shows a perspective view of apparatus 10 from a back side, and FIG. 1C shows a side view of apparatus 10. FIGS. 1D-1E show a perspective views of apparatus 10 moving in a first direction, and in a second direction, respectively. FIG. 1F shows a view of apparatus 10 in a closed position.

Apparatus 10 includes frame 16, connection means 17 and body 18. Frame 16 includes skids 20, roller 22 and frame plate 24. Body 18 includes optical sensor 26, screen 28, controllers 30, handles 32 and cover 34. Connection means 17 includes wheels 36 and rails 38. Apparatus 10 can be, for example, in the range of 700 grams to 10 kilograms.

Screen 28 can be integral to body 18 or can be detachable from body 18. In some embodiments, screen 28 can be integral with a tablet computer and/or be a touch screen. Screen 28 is large enough to display objects with a large amount of magnification, but small enough to be easily transportable, for example, seven inches (17.78 cm) to seventeen inches (43.18 cm). Apparatus 10 can include a cover 34, which can fold to protect screen 28 when not in use (FIG. 1F). Cover 34, in some embodiments, could also act as a screen to filter light from optical sensor 26 when apparatus 10 is in use. Cover 34 can also be detachable from apparatus 10, and could be connected to apparatus 10 through magnetic means or other methods of connection.

Optical sensor 26 can be a camera connected to a back surface of body 18 to enable screen 28 to move with body 18. In some embodiments, optical sensor 26 could be connected to a plate or other attachment which is connected to body 18 and/or screen 28. In some embodiments, optical sensor 26 could be connected directly to screen 28. Optical sensor 26 could also be moveable and/or rotatable so that it could capture an object, for example, at a distance and not located in the position at which object 12 is shown in FIGS. 1B-1E or an object directly in front of device 10. The object at a distance could be, for example, a monitor, a blackboard or a whiteboard. Screen 28, optical sensor 26 and/or other components of apparatus 10 can be powered by batteries, for example located within body 18, by a photovoltaic panel, by a plug-in power connection or by other means.

Controllers 30 are shown as buttons and a scroll wheel in the embodiment of FIGS. 1A-1F to control apparatus 10, screen 28 and/or optical sensor 26. Controllers 30 are typically large, easy to use controllers 30 which can perform various functions, such as turning apparatus 10 on or off, adjusting the screen 28 display and/or adjusting placement of optical sensor 26. In other embodiments, controllers 30 could include other types of controllers, including but not limited to a slide, switch, knob or other device for controlling the apparatus 10, screen 28, and/or optical sensor 26. In some embodiments, for example when screen 28 is a touch screen, apparatus 10 may have minimal or no other controllers 30.

Skids 20 can have a low-friction surface, for example, Polyoxymethylene ("POM"), and can have curved ends for easier sliding movement around and/or over object 12. Roller 22 can be made of a material which has more friction, to allow it to roll across a surface and/or across object 12.

Skids 20 and frame plate 24 connect to roller 22, such that they can rotatably move with respect to each other. This rotatable connection allows body 18 to go from a closed position in which back plate 24 sits against skids 20 and body 18 is substantially parallel with skids 20 and surface 13 (see FIG. 1F) to an open position for capturing and displaying object 12 (see FIGS. 1A-1E). In an open position, frame plate 24 is rotated to form an angle with surface 13, placing optical sensor 26 at a location for capturing an image of object 12. This angle can be, for example, in the range of 30 degrees to 70 degrees, or another angle depending on apparatus 10, object 12, lighting and other conditions related to the capturing and displaying of object 12.

Frame 16 connects to body 18 through wheels 36, which are connected to frame plate 24. Wheels 36 engage rails 38, which are connected to body 18. The engagement of wheels 36 and rails 38 allows for rolling or sliding movement between body 18 and frame 16 along rails 38. Rails 38 can have an end point to ensure that body 18 and frame 16 stay connected, and that the relative movement between body 18 and frame 16 does not make apparatus 10 unstable. Frame plate 24 can cover connection means 17 to protect connection means 17 and/or hide from view for aesthetic purposes. While the embodiment of FIGS. 1A-1F show wheels 36 on frame 16 and rails 38 on body 18, they could be switched around so that wheels are connected to body 18 and rails are connected to frame 16.

Apparatus 10 acts to capture and display object 12 with a stable and compact frame by allowing movement in a first direction (FIG. 1D) and in a second direction (FIG. 1E). In operation, apparatus 10 can be rotated open so that frame plate 24 sits at an angle from skids 20 and surface 13, and optical sensor 26 is in position to capture images of object 12, as shown in FIGS. 1A-1C. The user can then use controllers 30 to turn on apparatus 10 and adjust settings as desired. User may then position optical sensor 26 so that it is directed at a point on object 12 where the user wishes to start viewing. For example if object 12 is a page of text, the desired starting point may be at the upper left hand corner. To do this, the user may slide apparatus 10 over object 13 to the desired location. Optionally, the user may tilt apparatus 10 so that skids 20 are lifted from surface 13, and only roller 22 touches surface 13 and/or object 12. The user may then roll apparatus 10 to the upper part of object 12 (See FIG. 1D) across surface 13. Once at a desired position in that direction, the user may untilt apparatus 10 so that skids 20 lie on object 12 and/or surface 13, stabilizing apparatus 10. The tilting of the apparatus 10 and then rolling on roller 22 can be especially useful when object 13 is a thick or uneven object, for example, a book.

The user may then move body 18 in a second direction by pushing or pulling body 18 and/or screen 28, for example, using handles 32 (see FIG. 1E). Wheels 36 will allow body 18 to move with respect to frame 16 in the direction it is pushed or pulled. As optical sensor 26 is fixed to body 18, optical sensor 26 is moved with body 18, parallel and in tandem with screen 28. Optical sensor 26 is therefore positioned to capture the beginning of the text on object 12 so that screen 28 can display the text. As the user reads, for example, from left to right across object 12, the user can move body 18 by pushing or pulling handles 32 to move optical sensor 26 to follow along with natural reading movements, from left to right. When the user needs to move down the page to read, he can once again slide apparatus 10 in that direction so that optical sensor 26 captures a portion of object 12 down the page. As above, the user may optionally tilt apparatus 10 and roll on roller 22 for this movement. The user may then move body 18 in a second direction (across object 12, substantially perpendicular to the first direction) again in the manner described above. User may use handles 32 for tilting, rolling, and/or sliding movement of apparatus 10.

By forming apparatus 10 with frame 16 that includes roller 22 and skids 20 for movement across object 12 in a first direction (FIG. 1D) and connection means 17 for movement of optical sensor 26 relative to frame 16 in a second direction (FIG. 1E), apparatus 10 can provide a large viewing screen 28, while maintaining stability and portability. Roller 22 and skids 20 allow for movement back and forth in relation to object 12, while wheels 36 on rails 38 allow for side to side movement, allowing optical sensor 26 freedom of movement to capture object 12. The ability to move in a first direction and in a second direction also allows for a natural movement, for example, as the user is reading left to right, he can push on the handles 32 to move body 18 and screen 28 displaying object 12 left to right as well.

As discussed in the background section, past systems that had larger display screens typically included a support on which the object is placed. Then, the object is moved around on the support so that a camera can capture different parts of it for display on the screen. This type of device typically has required a large amount of space, is not truly transportable due to its weight and size, and involves movements which do not feel natural to the user. For example, when trying to read left to right across a page with a past device, the page must be moved in the opposite direction, from right to left across the support.

Other past reading assistance devices included a small screen which was rotatably connected to a base. The screen and base are simply moved over the object to be read. As this type of device relies on sliding movements of the entire device and requires the user to be able to consistently pick up the device for use, the overall weight and size is limited. This in turn limits the screen size and the ability to display high magnification views of object 12. It also limits the amount of information or text which can be displayed before the device must be moved.

By providing means 17 for movement between body 18 and frame 16, and providing means for moving frame 16 in another direction, apparatus 10 can support a larger viewing screen 28 than past portable devices while still being able to fold to a small overall package for true portability. The larger viewing screen allows for use by those that require more magnification for viewing than past small screen devices could easily handle and provides the ability to have more information or text displayed before having to move apparatus 10. Frame 16 and means to move apparatus 10 in two directions allows for stable support of larger screen 28, while eliminating the need for a user to be constantly lifting the viewing apparatus to move it when viewing an object or to move object in relation to the apparatus. The ability to move in two directions over object 12 also allows a user to view object 12 through screen 28 with easy and natural movements, as the user moves body 18 and apparatus 10 in the direction the eyes would move on object 12. The connections between frame 16 and body 18 also allow for a stable device which the user is able to close when not in use, and could be easily transportable due to its size and compactness when closed.

FIGS. 2A-2D show alternative embodiments of apparatus 10, with different means for moving apparatus 10, and particularly frame 16 in a first direction across object 12. Similar parts are labeled similarly to FIGS. 1A-1F.

Figure 2A:
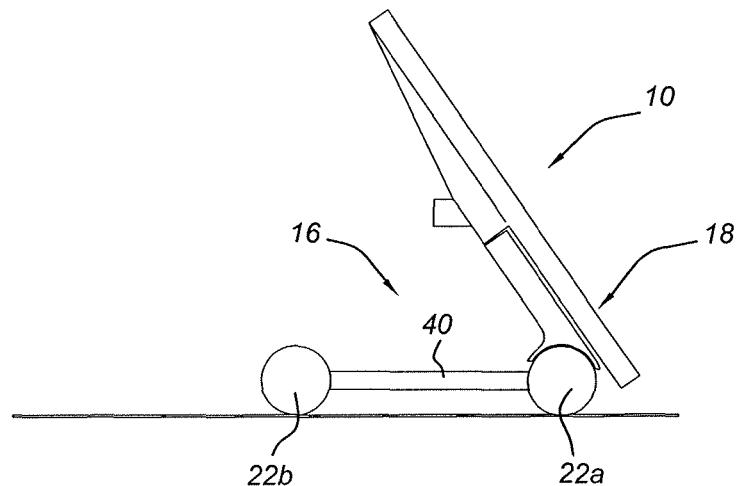
FIG. 2A shows a side view of an apparatus for viewing an object with multiple rollers for movement in a first direction.

FIG. 2A shows a side view of apparatus 10 for viewing an object with multiple rollers 22a, 22b for movement across an object 12. Rollers 22a and 22b can be connected by rod 40. Roller 22b can extend across the entire width of frame 16, or could be one or two small rollers 22b connected to frame 16 and/or roller 22a. Similarly roller 22a could be a number of smaller rollers connected to frame 16.

Figure 2B:
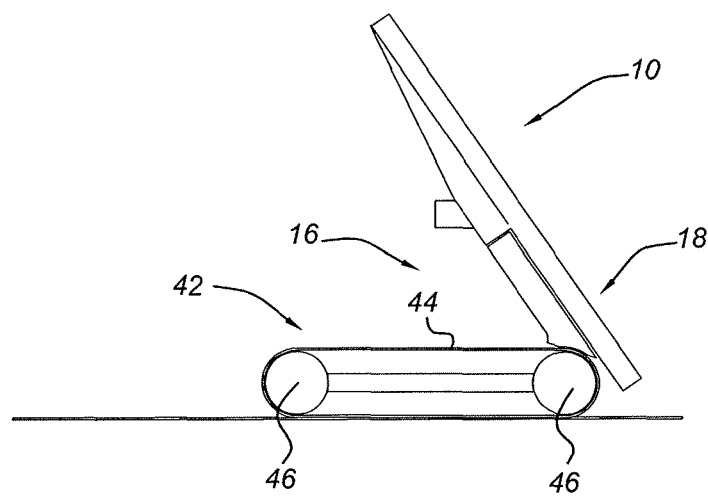
FIG. 2B shows a side view of an apparatus for viewing an object with a caterpillar tread for movement in a first direction.

FIG. 2B shows a side view of apparatus 10 with a caterpillar tread 42 for movement across an object 12. Caterpillar tread 42 can be motorized and includes track 44, which wraps around wheels 46 to make an endless loop. Apparatus 10 can have a single caterpillar tread 42 or multiple caterpillar treads 42 for moving apparatus 10 in a first direction. Caterpillar tread 42 could also include more wheels 46 in other embodiments and could include controls on body 18, frame 16 or elsewhere.

In the embodiments shown in FIGS. 2A-2B, apparatus can be rolled on rollers 22a, 22b or moved on caterpillar tread 42 for movement in a first direction.

Figure 2C:
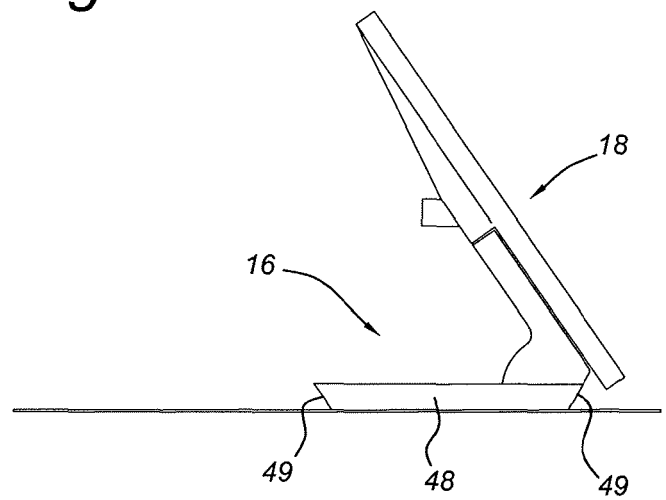
FIG. 2C shows a side view of an apparatus for viewing an object with a sliding foot for movement in a first direction.

FIG. 2C shows a side view of apparatus 10 with a slide 48 for movement across an object 12. Slide 48 is angled at edges 49 to permit easier movement of apparatus 10. Slide 48 can be made of materials which permit easy sliding movements for moving apparatus 10 over object 12 and/or surface 13, for example, POM.

Figure 2D:
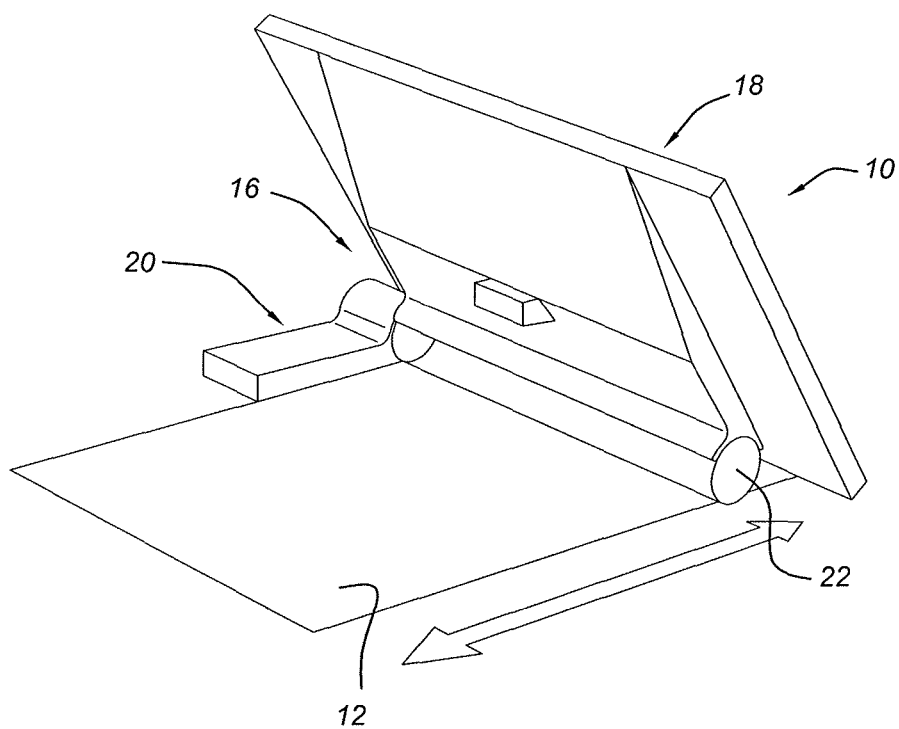
FIG. 2D shows a side view of an apparatus for viewing an object with a single sliding foot and a roller for movement in a first direction.

FIG. 2D shows a side view of apparatus 10 for viewing an object 12 with a roller 22 and a single skid 20.

As in FIGS. 1A-1F, the embodiments shown in FIGS. 2C-2D allow for easy movement of apparatus 10 in a first direction through tilting apparatus 10 and then sliding (FIG. 2D) or rolling (FIG. 2E) apparatus 10. While a number of embodiments are shown as example means for moving frame 16 in a first direction, other means could also be used.

FIGS. 3A-3E shows alternative embodiments of apparatus 10, with different means for moving apparatus 10 in a second direction, particularly in relation to moving body 18 relative to frame 16. Similar parts are labeled similarly to FIGS. 1A-1F.

Figure 3A:
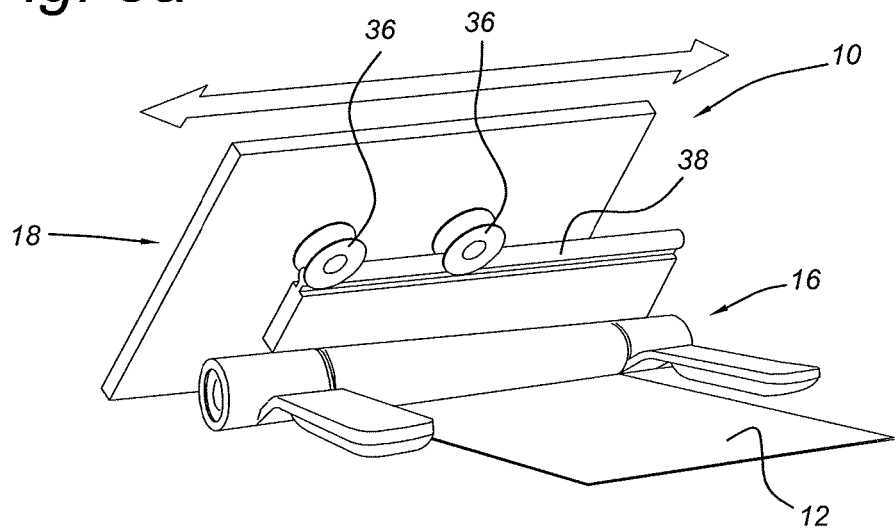
FIG. 3A shows a back perspective view of an apparatus for viewing an object using wheels on profile for moving an optical sensor.
Figure 3B:
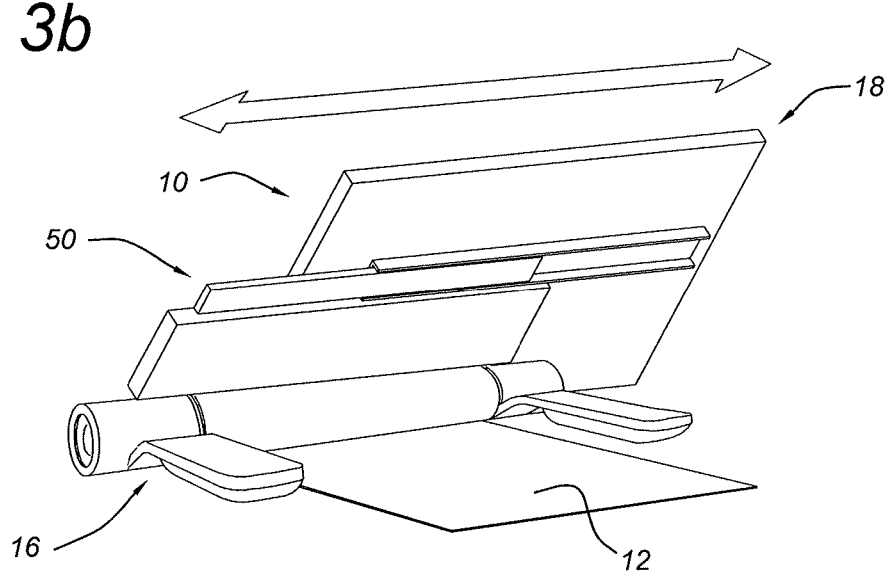
FIG. 3B shows a back perspective view of an apparatus for viewing an object using a plain bearing with low friction for moving an optical sensor.
Figure 3C:
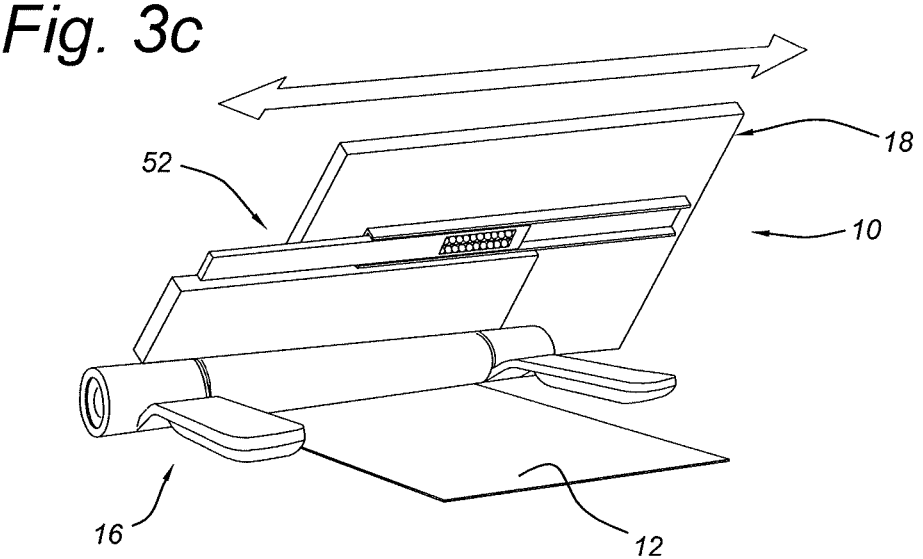
FIG. 3C shows a back perspective view of an apparatus for viewing an object using a ball bearing with carriage for moving an optical sensor.

FIG. 3A shows a back perspective view of apparatus 10 with wheels 36 connected to body 18 and track 38 connected to frame 16. FIG. 3B shows a perspective view of apparatus 10 with a plain bearing 50 with low friction for sliding body 18 in relation to frame 16. FIG. 3C shows a perspective view of apparatus 10 with a ball bearing with carriage for moving body 18 in relation to frame 16.

Each of the means shown in FIGS. 3A-3C allow for relative movement between body 18 and frame 16, allowing optical sensor 26 to move in a second direction.

Figure 3D:
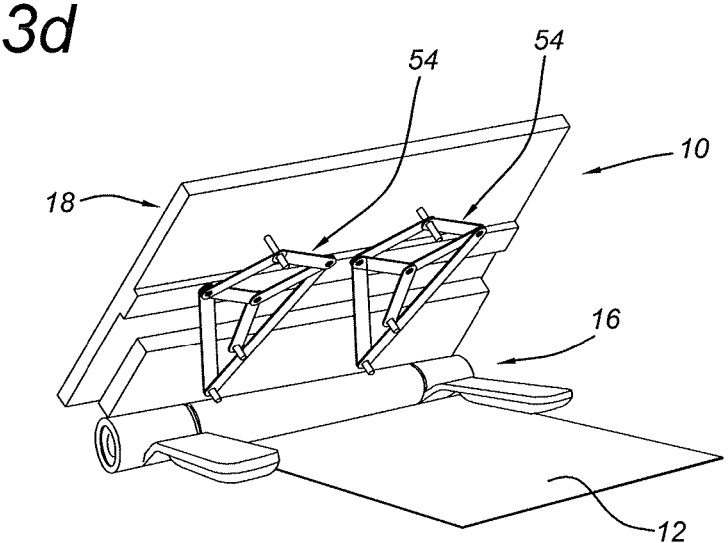
FIGS. 3D-3E show a back perspective view of an apparatus for viewing an object using linkage with multiple rotation points for moving an optical sensor.
Figure 3E:
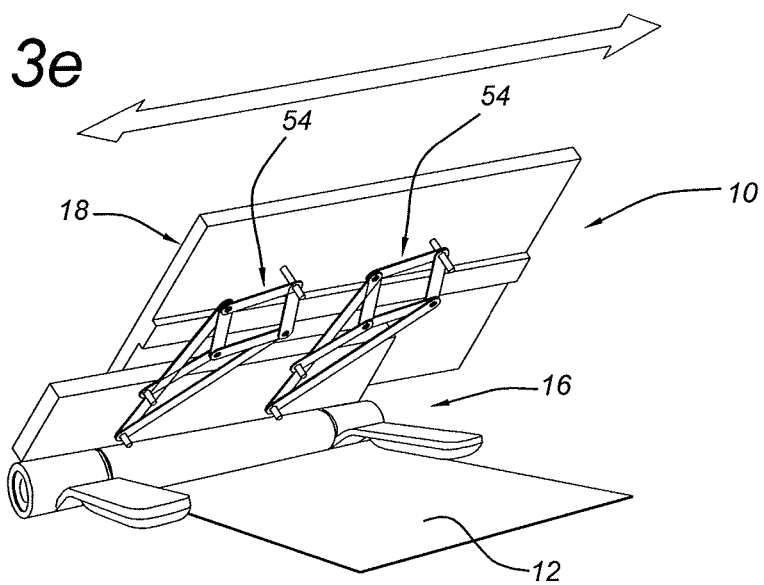

FIGS. 3D-3E show a perspective view of an embodiment of apparatus 10 which uses linkages 54 with multiple rotation points for moving body 18 relative to frame 16. In FIG. 3D, body 18 is aligned with the center of frame 16, and in FIG. 3E, linkages allow for body 18 to move relative to frame 16. While a number of embodiments are shown as example means for moving optical sensor 26 in relation to frame 16 in a second direction, other means could be used, for example, other sliding, rolling or suspension means which permit relative movement.

Figure 4:
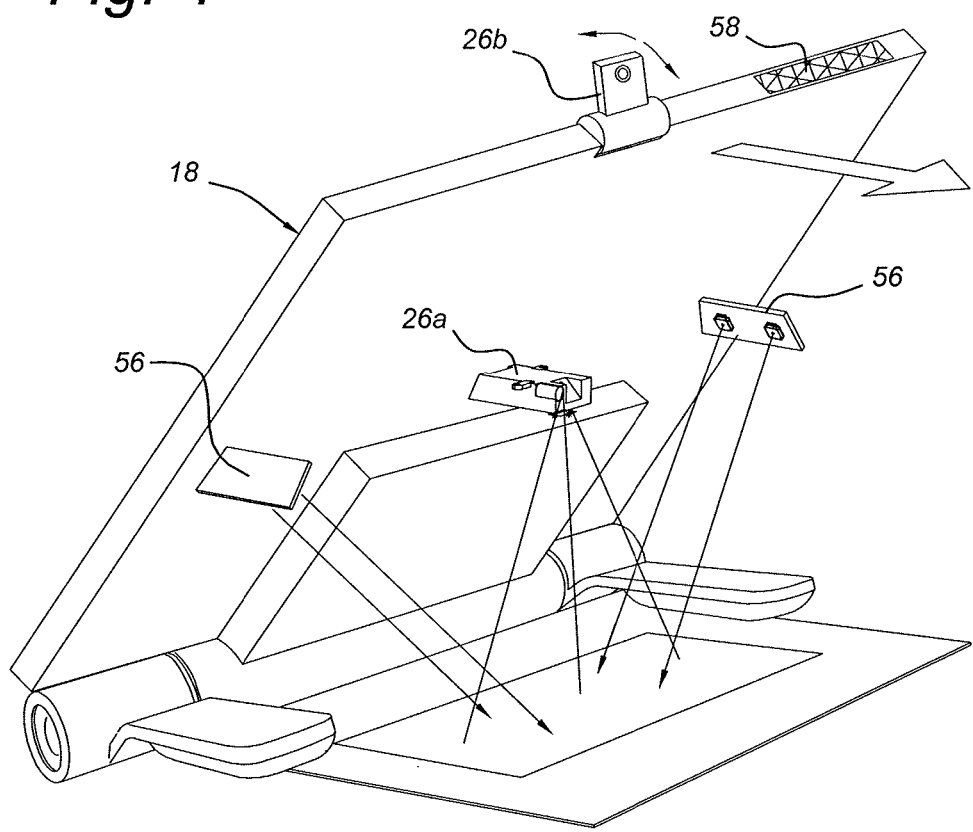
FIG. 4 shows an embodiment of an apparatus for viewing an object with two optical sensors and a lighting arrangement.

FIG. 4 shows an embodiment of apparatus 10 for viewing object 12 with two optical sensors 26a, 26b and a lighting arrangement 56. As in the embodiments shown in FIGS. 1A-3F, apparatus 10 can move in a first direction and in a second direction for capturing object 12 and displaying on screen 28.

In the embodiment of apparatus 10 shown in FIG. 4, apparatus includes a second optical sensor 26b, which is positioned at the top of body 18 and is movable and able to be pointed at objects not on surface 13. For example, optical sensor 26b could point at object at a distance or an object directly in front of device 10. These objects at a distance could be, for example, a monitor, a blackboard or a whiteboard. This configuration can be especially useful when using apparatus 10 for performing hobbies which could take place in front of apparatus 10. In other embodiments, apparatus 10 may only have optical sensor 26*b* and/or optical sensor 26*a* may be moveable with respect to body 18.

Apparatus 10 also includes light sources 56, for example, light emitting diodes ("LEDs") powered by photovoltaic panel 58. Light sources 56 can be directed toward the same surface which optical sensor 26*a* captures for display on screen 28 or could be rotatable and/or moveable to point in other directions. Light sources 56 can illuminate object 12, making the display on screen 28 more clear. Different numbers and/or arrangements of light sources 56 and/or optical sensors 26*a*, 26*b* could be used in other embodiments.

In summary, apparatus 10 allows for easy and stable viewing of object 12 through providing frame 16 with means for moving apparatus 10 across surface 13 and/or object 12 in a first direction and means for moving optical sensor 26 relative to frame 16 in a second direction. This allows for the user to move apparatus 10 and view object 12 with natural movements and allows for a larger screen 28 for display than past portable systems. Frame 16 holds body stable for viewing and allows for compact folding and storage when not in use, and means for movement in first and second directions allow for a user to easily and naturally view all parts of an object on a surface with apparatus 10.

While apparatus 10 has been shown to have means which allow movement in a first direction in an "up and down the page" direction and means for moving in a second direction substantially perpendicular to that and "across the page," these directions are for example purposes only, and the first and second directions could be oriented differently with respect to each other, object 12 and/or surface 13. For example, roller 22 could be angled to promote diagonal movement.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. An apparatus to capture and display an image of an object on a surface, said apparatus comprising:
   a frame,
   at least one optical sensor for capturing the image of the object,
   means for moving the frame relative to the surface of the object in a first direction with a translational movement, and
   means for moving the optical sensor relative to the frame in a second direction, wherein the means for moving the frame relative to a surface of the object in a first direction comprises first and second skids rotatably connected to a side of the frame comprising a roller between the first and second skids, wherein the first and second skids rotatably connect on an end of the skid to a side of the frame and rotates such that one extends in front of the frame at each side of the frame to support the apparatus with respect to the surface such that the surface is visible in a center region in front of the frame between the skids.

2. The apparatus of claim 1, and further comprising: a screen for displaying the image of the object.

3. The apparatus of claim 2, wherein the optical sensor and the screen move in tandem.

4. The apparatus of claim 2, wherein the optical sensor is attached to a back surface of the screen or to a plate positioned behind the screen.

5. The apparatus of claim 2, wherein the second direction is parallel to the screen.

6. The apparatus of claim 2, wherein the screen is removable from the apparatus.

7. The apparatus of claim 2, wherein the screen is integral with a tablet computer.

8. The apparatus of claim 2, wherein the screen is a touch screen.

9. The apparatus of claim 2, and further comprising: controls connected to the frame and/or the screen for controlling the screen, movement of the apparatus and/or the optical sensor.

10. The apparatus of claim 2, wherein the means for moving the frame across a surface of the object in a first direction define a plane, and the screen has a first position parallel to the plane, and a second position at an angle to the plane.

11. The apparatus of claim 10, wherein the angle is from 30 degrees to 70 degrees.

12. The apparatus of claim 1, wherein the optical sensor is on a back side of a screen, and the frame covers only a part of the of back surface of the screen.

13. The apparatus of claim 1, wherein the first and second skids have upwardly curved ends and/or are provided with a low friction surface.

14. The apparatus of claim 1, wherein the means for moving the optical sensor relative to the frame comprises a slide.

15. The apparatus of claim 1, wherein the second direction is perpendicular to the first direction.

16. The apparatus of claim 1, and further comprising: a lighting arrangement for lighting the object.

17. The apparatus of claim 1, wherein the optical sensor can be movable relative to the frame.

18. The apparatus of claim 1, and further comprising: a second optical sensor which can be moveable relative to the frame.

19. The apparatus of claim 1, wherein at least one of the means for moving the frame across a surface of the object in a first direction and the means for moving the optical sensor relative to the frame in a second direction is motorized.

20. The apparatus of claim 1, and further comprising a photovoltaic panel for powering the apparatus.

21. The apparatus of claim 1, wherein the apparatus has a weight in the range of 700 grams to 10 kilograms.

22. An apparatus to capture and display an image of an object, said apparatus comprising:
   a frame able to support a device with at least one optical sensor for capturing the image of the object,
   means for moving the frame relative to a surface of the object in a first direction with translational movement, and
means for moving the optical sensor relative to the frame in a second direction, wherein the means for moving the frame relative to a surface of the object in a first direction comprises first and second skids rotatably connected to a side of the frame such that they extend in front of the frame when the apparatus is in use and means to facilitate rolling movement located between the first and second skids.

23. A method of forming a device for displaying an image of an object, the method comprising: forming a frame which can move across a surface of the object, the frame comprising at least one skid rotatably connected to a side of the frame and rotatably extends in front of the frame to a side of the frame for supporting the device when in use and a roller adjacent to the at least one skid; and connecting a body with at least one optical sensor to the frame so that the body can move in relation to the frame in a second direction with translational movement such that the optical sensor is able to capture an object on a surface in front of the device and to a side of the skid.

24. The device of claim 22, and further comprising: a device with an optical sensor and/or a screen connected to the frame.

* * * * *